Aug. 14, 1934.  W. J. ALLMAN  1,969,919
RAILWAY MOTOR TRUCK
Filed May 18, 1932
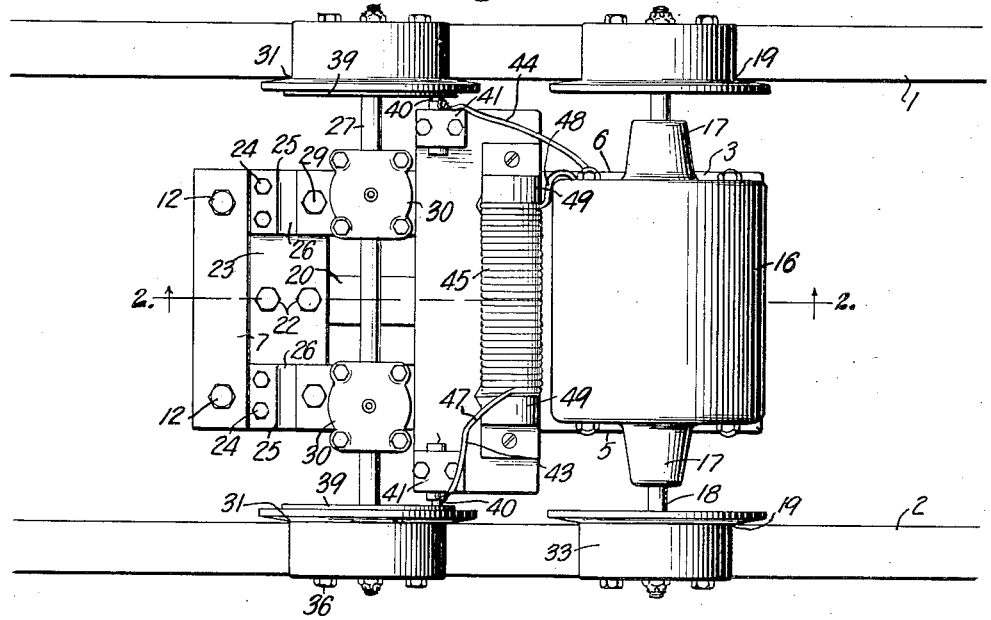
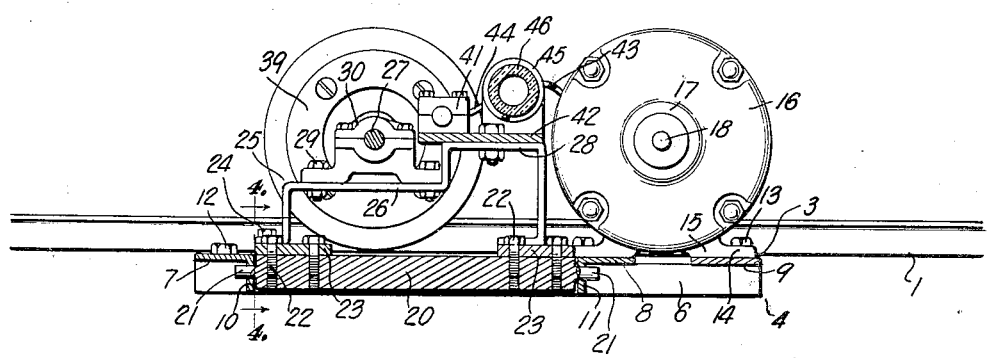
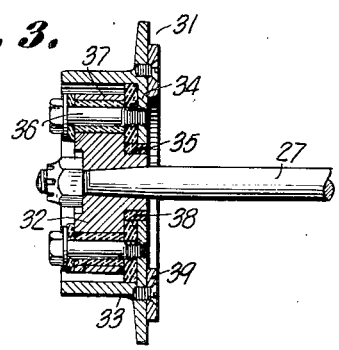
INVENTOR.
Wilsie J. Allman
BY
ATTORNEY.

Patented Aug. 14, 1934

1,969,919

UNITED STATES PATENT OFFICE 1,969,919

RAILWAY MOTOR TRUCK

Wilsie James Allman, Kansas City, Mo.

Application May 18, 1932, Serial No. 612,050

7 Claims. (Cl. 105—49)

My invention relates to railway motor trucks, and more particularly to a device of that character adapted for use on narrow gauge portable tracks of the type employed for carrying a lure over and about the track of a dog race course.

With apparatus of this character the truck is propelled by an electrical motor mounted on the truck and supplied with current through the track rails, speed of travel of the truck being controlled by regulation of flow of current to the rails. To provide direct application of power for propelling the truck, the drive wheels are preferably mounted on extensions of the motor shaft, and current supplied to the motor through a second pair of wheels. Weight of the motor holds the drive wheels to the rails, but when the track is mounted on uneven ground, or at banked curves, there is a tendency to twist of the frame and lifting of one or more of the truck wheels, particularly those carrying the least load, from their rails.

It is the principal object of the present invention to provide a truck of the type specified having the necessary flexibility for maintaining constant contact of all of the wheels with the rails of the track over which the truck is propelled, and in accomplishing this object, I have provided improved details of structure, the preferred form of which is illustrated in the accompanying drawing, wherein:

Fig. 1 is a plan view of a truck embodying my invention supported on track rails.

Fig. 2 is a vertical section on the line 2—2, Fig. 1, the truck motor being shown in end elevation.

Fig. 3 is a central transverse section of one of the wheels illustrating its shaft mounting.

Fig. 4 is a vertical section of the truck subframe on the line 4—4, Fig. 2.

Referring more in detail to the drawing:

1 and 2 designate rails of a track preferably of portable type so that it may easily be moved for installation at different locations. 3 designates a truck body, preferably including a main frame 4 formed of longitudinal side rails 5 and 6 of channel iron, and connected by front, rear and intermediate cross plates 7, 8 and 9, the front and intermediate cross plates having depending front and rear flanges 10 and 11, respectively, forming a space therebetween for a purpose presently defined, the front plate being secured to the side rails by bolts 12 extending through the plates into the side rails and the plates 8 and 9 being secured to the side rails by bolts 13, which extend through the ears 14 of the base 15 of a motor housing 16 and through the plates into the side rails.

The motor housing is of ordinary type arranged transversely of the truck and provided with end bearings 17 for a motor shaft 18 to which the drive wheels 19 are rigidly connected to provide direct drive from the motor to the propelling wheels.

Extending longitudinally through the center of the subframe between the flanges 10 and 11 is a rock bar 20 having trunnions 21 rotatably mounted in the flanges 10 and 11, the rock bar being preferably rectangular in cross section and dimensioned to extend above the plane of the cross plates, 7, 8 and 9, but terminating above the plane of the lower edges of the side rails and trunnion flanges. Fixed to the rock bar 20 by bolts or the like 22, are cross bars 23. Mounted on the cross bars 23 and attached thereto by bolts 24 are longitudinal supporting brackets 25 having angular feet providing firm bearing on the cross bars and bent to provide a lower seat 26 for the front steering wheel shaft 27 and an upper seat 28 for supporting elements presently described, the cross bars and brackets thus forming a secondary frame pivotally mounted, by means of the rock bar, in the main frame.

Fixed to the lower seat members 26 by bolts 29 are bearings 30 for the front steering wheel shaft 27, which extends laterally from the truck frame to carry the steering or conductor wheels 31 in alignment with the rear driving wheels 19.

To insulate the wheels, both front and rear, from their shafts, I construct each with separate hub and rim portions 32 and 33, and provide the rim portions at their inner rail flanged edges with inwardly directed flanges 34, which extend inwardly into a circumferential groove 35 in the inner face of the hub portion, the hub and rim members being rigidly secured together by transverse bolts 36 insulated from the wheel hub by non-conductive collar and ring members 37 and 38 surrounding the bolts and fitting within the circumferential groove respectively.

Fixed to the rim member of each of the front steering wheels is a distributor ring 39 contacted by a brush 40 slidably mounted in a bearing 41 on a plate 42 mounted on the upper seat members 28 of the respective brackets 25 and normally yieldingly urged to contact with the distributor ring by a thrust spring (not shown) in accordance with ordinary practice.

Current is conducted from the brushes to the motor by wires 43 and 44 and in order to provide the necessary resistance for protecting the motor windings a coil 45, wound on an insulator 46, is connected in series with the wire 43 as indicated at 47 and 48, the insulator being preferably supported by brackets 49 mounted on the plate 42.

Assuming a truck to be constructed as described and to be mounted on an energized railway track, the operation thereof would be as follows:

Upon closing the switch controlling supply of current to the rails, the current flows along one rail and is conducted therefrom by the rim of the steering wheel running thereover and by its related distributor ring, brush and lead wire through the resistance coil and into the motor windings. Excessive loading of the motor windings is thus prevented by the resistance coil and the current is returned from the motor, through the opposite lead wire, brush and steering wheel rim to the other rail.

Energization of the motor immediately causes rotation of the armature or drive shaft and propels the truck along the rails, and because of the flexibility provided in the vehicle by the pivotal mounting of the rock bar, carrying the steering wheel shaft, all of the wheels are maintained in constant contact with the rails, although irregularities may be present in the track.

A conductive connection between the rails and steering wheel rims is thus insured at all times, a result that cannot be accomplished with trucks wherein no flexibility is provided between the steering wheel and drive shafts.

While I have described my invention as being designed particularly for carrying a lure over and about the track of a dog race course, it will be apparent that a truck constructed substantially as described may be readily adapted for carrying various types of loads or for drawing loaded trailers along a track.

What I claim and desire to secure by Letters Patent is:

1. A device of the character described including a main frame, a motor on the frame, a pair of drive wheels operably connected with the motor, means suspending one end of the main frame from the drive wheels, a secondary frame rockably mounted on the other end of the main frame, a pair of conductor wheels suspendingly supporting the secondary frame, and means conductively connecting said last named wheels to the motor.

2. A device of the character described including a main frame, a motor on the frame including an armature shaft, means suspending one end of the main frame from the motor below the armature shaft, drive wheels fixed on said shaft, a secondary frame rockably mounted on the other end of the main frame, a pair of conductor wheels suspendingly supporting the secondary frame, and means conductively connecting said last named wheels to the motor.

3. A device of the character described including a main frame, a motor mounted transversely on the frame including an armature shaft, drive wheels fixed on the ends of said shaft, means suspending one end of the main frame below the armature shaft, a rock bar carried at the other end of the main frame, a secondary frame mounted on the rock bar, a transverse shaft in parallel relation to the armature shaft, conductor wheels fixed to said transverse shaft, means suspending the secondary frame from the transverse shaft, and means conductively connecting said last named wheels to the motor.

4. A truck of the character described for running on energized rails including a pair of parallel shafts, a pair of pivotally connected frame members, means suspending the frame members from the shafts whereby the shafts are retained in rocking relation, flanged wheels on said shafts and insulated therefrom, distributor rings on the wheels of one of the shafts, a motor on the other shaft for driving the truck on the rails, and means conductively connecting the distributor rings with the motor to conduct current from the rails to said motor.

5. A truck of the character described including a main frame having spaced cross members, a motor on the frame, a pair of drive wheels operably connected with the motor, means suspendingly supporting the main frame from the drive wheels and below the axis thereof, a secondary frame having aligned trunnions pivotally mounted on said cross members of the main frame, a pair of conductor wheels rotatably carried by the secondary frame, means suspendingly supporting the secondary frame from the conductor wheels and below the axis thereof, means for insulating said wheels from the frames, and means for conductively connecting said last named wheels to the motor.

6. A truck of the character described including a main frame, a motor on the frame, a pair of drive wheels operably connected with the motor, means suspending the main frame below the axis of said drive wheels, a secondary frame rockably mounted on the main frame, a pair of conductor wheels, means suspending the secondary frame from the conductor wheels, means insulating the wheels from said frames, and means for conductively connecting the conductor wheels with the motor including brushes carried by the secondary frame and engaging the conductor wheels.

7. A truck of the character described including a main frame having spaced cross members, a motor on the frame, a pair of drive wheels operably connected with the motor, a secondary frame including a rock bar having aligned trunnions journaled in said cross members with the upper surface of the bar in a plane above the upper surface of the main frame to permit limited rocking of the secondary frame on the main frame, a pair of conductor wheels rotatably carried by the secondary frame, and means conductively connecting said last named wheels to the motor.

WILSIE JAMES ALLMAN.